US010895713B2

(12) United States Patent
Wang et al.

(10) Patent No.: US 10,895,713 B2
(45) Date of Patent: Jan. 19, 2021

(54) ACTUATOR FRAME FOR SCANNING MIRROR

(71) Applicant: Microsoft Technology Licensing, LLC, Redmond, WA (US)

(72) Inventors: Jincheng Wang, Sammamish, WA (US); Wyatt Owen Davis, Bothell, WA (US); Michael James Nystrom, Mercer Island, WA (US); Joshua Owen Miller, Woodinville, WA (US); Richard Allen James, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 166 days.

(21) Appl. No.: 16/164,526

(22) Filed: Oct. 18, 2018

(65) Prior Publication Data
US 2020/0124823 A1 Apr. 23, 2020

(51) Int. Cl.
*G02B 7/182* (2006.01)
*G02B 26/10* (2006.01)

(52) U.S. Cl.
CPC ........ *G02B 7/1821* (2013.01); *G02B 26/105* (2013.01)

(58) Field of Classification Search
None
See application file for complete search history.

(56) References Cited

U.S. PATENT DOCUMENTS

| 5,606,447 | A | * | 2/1997 | Asada | G02B 26/0816 359/199.1 |
| 5,629,790 | A | * | 5/1997 | Neukermans | G02B 26/0841 250/234 |
| 7,187,483 | B1 | * | 3/2007 | Orcutt | G02B 26/085 359/197.1 |
| 7,619,798 | B2 | * | 11/2009 | Matsuda | G02B 26/105 359/199.4 |
| 7,643,197 | B2 | * | 1/2010 | Kato | G02B 26/105 359/224.1 |
| 7,855,820 | B2 | * | 12/2010 | Kato | G02B 26/0833 267/154 |
| 7,869,108 | B2 | * | 1/2011 | Asada | G02B 26/085 359/199.4 |

(Continued)

OTHER PUBLICATIONS

"International Search Report and Written Opinion Issued in PCT Application No. PCT/US2019/052530", dated Dec. 2, 2019, 11 Pages.

*Primary Examiner* — Jennifer D. Carruth
(74) *Attorney, Agent, or Firm* — Alleman Hall Creasman & Tuttle LLP

(57) ABSTRACT

Examples are disclosed that relate to actuator frames for scanning mirror systems. In one example an actuator frame for a scanning mirror assembly comprises a mounting member comprising a first side and an opposite second side. A first moveable member comprises a first interior side that defines a first gap and a second gap with the first side of the mounting member. A second moveable member comprises a second interior side that defines a third gap and a fourth gap with the second side of the mounting member. A first hinge connects a central portion of the mounting member with the first moveable member, and a second hinge connects the central portion of the mounting member with the second moveable member.

19 Claims, 13 Drawing Sheets

(56) References Cited

U.S. PATENT DOCUMENTS

| | | | |
|---|---|---|---|
| 8,472,096 B2* | 6/2013 | Fujii | G02B 26/0833 |
| | | | 310/36 |
| 9,423,591 B2 | 8/2016 | Mori et al. | |
| 2005/0116551 A1* | 6/2005 | Yoda | H02K 33/16 |
| | | | 310/36 |
| 2005/0162724 A1* | 7/2005 | Orcutt | B81B 3/007 |
| | | | 359/224.1 |
| 2005/0225821 A1* | 10/2005 | Orcutt | G02B 26/0858 |
| | | | 359/224.1 |
| 2007/0063619 A1* | 3/2007 | Dewa | G02B 26/0858 |
| | | | 310/328 |
| 2007/0091441 A1* | 4/2007 | Orcutt | G02B 26/105 |
| | | | 359/606 |
| 2007/0146857 A1* | 6/2007 | Orcutt | G02B 26/105 |
| | | | 359/224.1 |
| 2007/0268950 A1 | 11/2007 | Spinelli et al. | |
| 2009/0174921 A1* | 7/2009 | Sendo | H02K 33/16 |
| | | | 359/200.7 |
| 2011/0228440 A1 | 9/2011 | Kato et al. | |
| 2020/0209614 A1* | 7/2020 | McDonald | H02N 1/006 |
| 2020/0247052 A1* | 8/2020 | Payne | B33Y 10/00 |

* cited by examiner

ACTUATOR FRAME FOR SCANNING MIRROR

BACKGROUND

In a scanning display system, light from a light source may be scanned in one or more directions via a controllable mirror to produce a viewable image.

SUMMARY

Examples are disclosed that relate to scanning display systems. As described in more detail below, one example provides an actuator frame for a scanning mirror assembly, with the frame comprising a mounting member having a first side and an opposite second side. A first moveable member comprises a first interior side that defines a first gap and a second gap with the first side of the mounting member. A second moveable member comprises a second interior side that defines a third gap and a fourth gap with the second side of the mounting member. A first hinge connects a central portion of the mounting member with a central portion of the first moveable member. A second hinge connecting the central portion of the mounting member with a central portion of the second moveable member.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
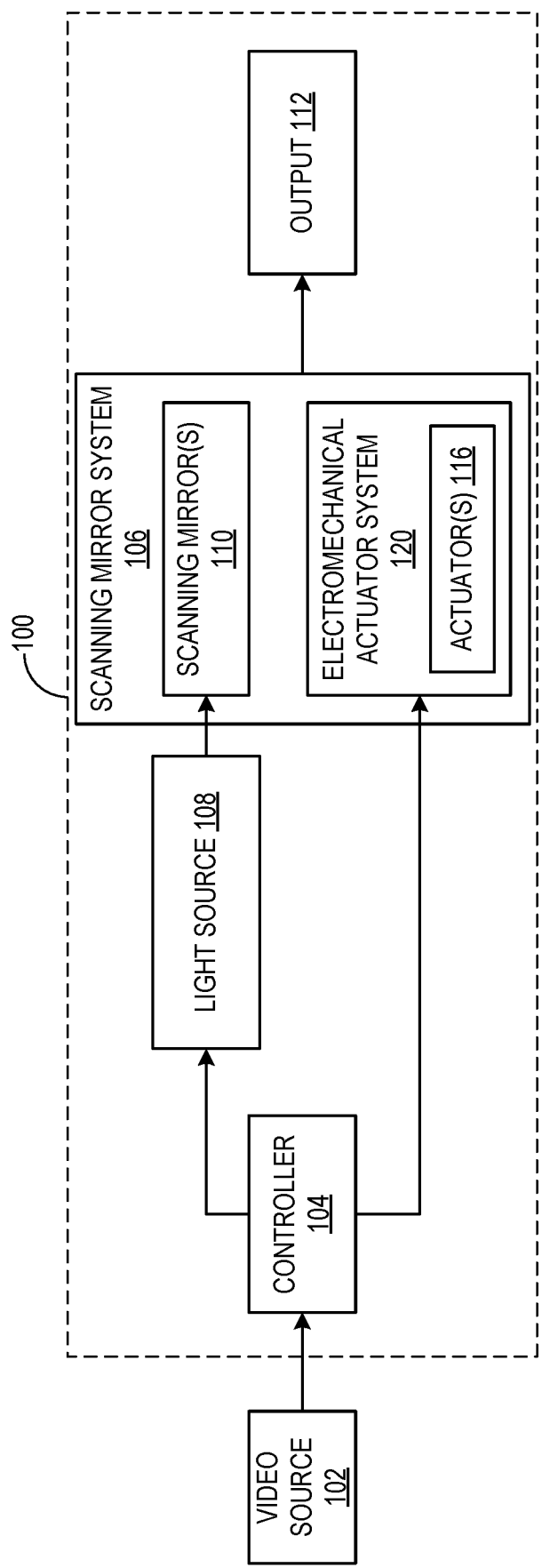
FIG. 1 schematically shows an example display device that includes a scanning mirror system according to examples of the present disclosure.

In some scanning display systems, laser light is reflected by a mirror assembly at different angles to project reflected laser light throughout a field-of-view (FOV). To achieve a range of reflection angles, a suitable actuator such as a microelectromechanical system (MEMS) actuator may rotate the mirror assembly. Various types of scanning mirrors may be used, including but not limited to MEMS mirrors.

A MEMS actuator may rotate a mirror assembly about an axis in horizontal and vertical directions to produce viewable images in a FOV. In different examples, the mirror system may include a single mirror driven in both horizontal and vertical directions, or two mirrors separately driven in horizontal and vertical directions. Different scan rates may be employed in the horizontal and vertical directions. In a two mirror system, for example, a horizontally scanned mirror may be driven at a relatively fast rate (e.g., ~27 kHz), whereas a vertically scanned mirror may be driven at a relatively slower rate (e.g., ~60 Hz). The horizontal and vertical scan rates may at least partially determine the resolution of images generated at these rates, along with other factors such as mirror aperture (e.g., diameter) and scan angle.

In some scanning display systems, the scanning mirror is mounted for rotation via two flexures. The flexures are attached to a rectangular frame. Actuators, such as piezoelectric (PZT) actuators, are attached to the 4 corners of the frame on either side of each flexure attachment. Each corner of the frame adjacent to one flexure attachment is directly connected by one side of the frame to the opposite corner where the opposite flexure attachment is located.

These mounting designs, however, present several drawbacks. For example, these configurations structurally couple opposing actuators on opposite ends of the frame. With PZT actuators, this frame design directly structurally couples PZTs with the same polarization to each other through a frame arm. Such structural coupling can create one or more spurious modes during operation, with such modes causing exaggerated and undesired mirror movements. These spurious modes both increase component stresses and reduce reliability of the scanning mirror assembly, while also decreasing the power efficiency of the system.

Another drawback of these configurations is that the potential surface(s) that may be mounted to an underlying substrate are limited to being located in the area inside the rectangular frame. Further, adding additional mounting features outside the area defined by the frame will increase the frame's stiffness and make it even less power efficient.

Examples are disclosed herein that relate to actuator frame configurations for a scanning mirror assembly that minimize undesired spurious modes and operate in a highly power efficient manner. Additionally, one or more features mounting the frame to an underlying substrate can have a wide variety of sizes and shapes without negatively affecting the system's reliability and power efficiency.

FIG. 1 schematically shows an example display device 100 in communication with a video source 102. Display device 100 includes a controller 104 operatively coupled to a scanning mirror system 106 and to a light source 108. Controller 104 is configured to control the scanning mirror system 106 and the light source 108 to emit light based on video image data received from video source 102. Light source 108 may include any suitable light-emitting elements, such as one or more lasers. Light source 108 may output light in any suitable wavelength ranges—e.g., red, green, and blue wavelength ranges that enable the production of color images. In other examples, light source 108 may output substantially monochromatic light.

Scanning mirror system 106 comprises one or more scanning mirrors 110 controllable to vary an angle at which light from the light source is reflected to thereby scan an image. As mentioned above, scanning mirror system 106 may include a single mirror configured to scan light in horizontal and vertical directions, or separate mirrors for scanning in the horizontal and vertical directions. In other examples, scanning mirror system 106 may scan light in any other suitable manner via any suitable number of mirrors.

The scanning mirror system 106 comprises an electromechanical actuator system 120 comprising one or more actuators 116 controllable to rotate the scanning mirror(s) 110 of a scanning mirror assembly. As described in more detail below, the actuator(s) 116 are mounted to moveable members of an actuator frame. Light reflected by the scanning mirror(s) 110 is directed toward an output 112 for display of a scanned image. Output 112 may take any suitable form, such as projection optics, waveguide optics, etc. In different examples, display device 100 may be configured as a fully-immersive, virtual reality head-mounted display (HMD) device, a mixed reality HMD device that provides a view of a real-world environment, or any other suitable display device, such as a head-up display, mobile device screen, monitor, television, etc.

Figure 2:
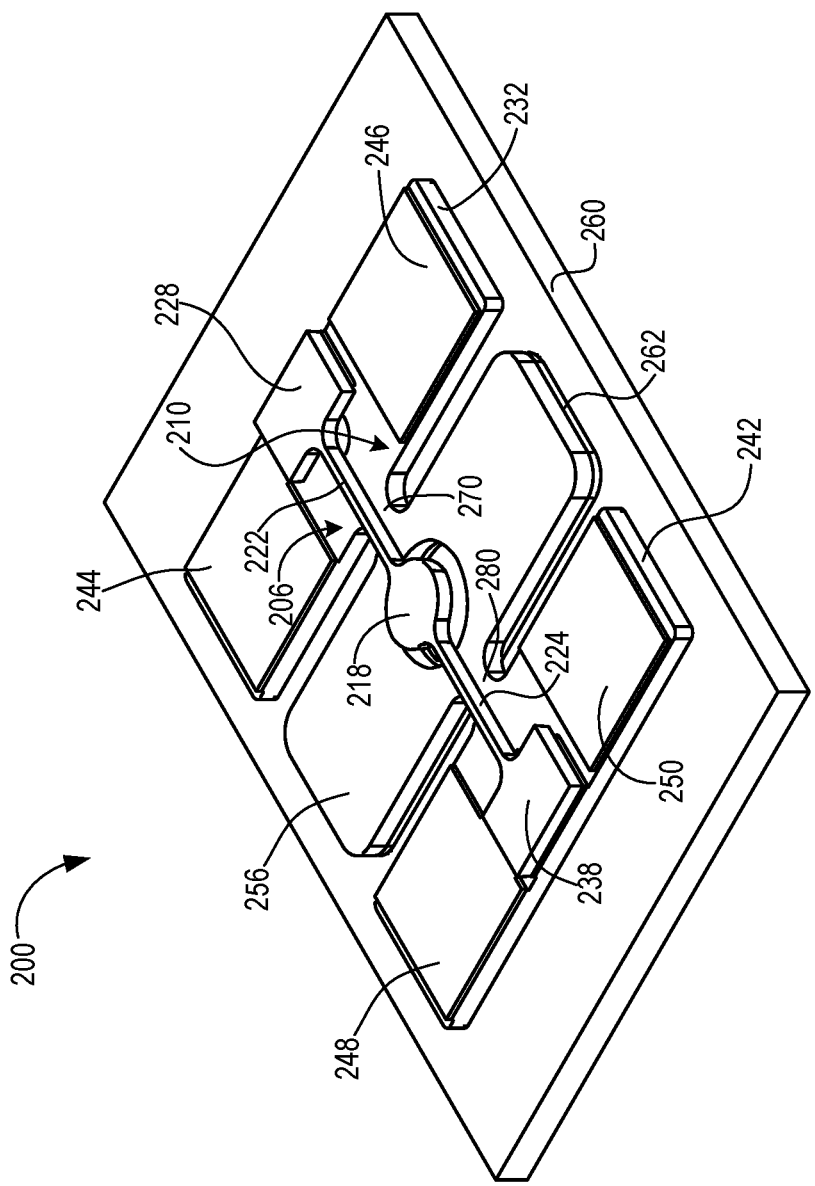
FIG. 2 shows an example scanning mirror system including an actuator frame according to examples of the present disclosure.
Figure 3:
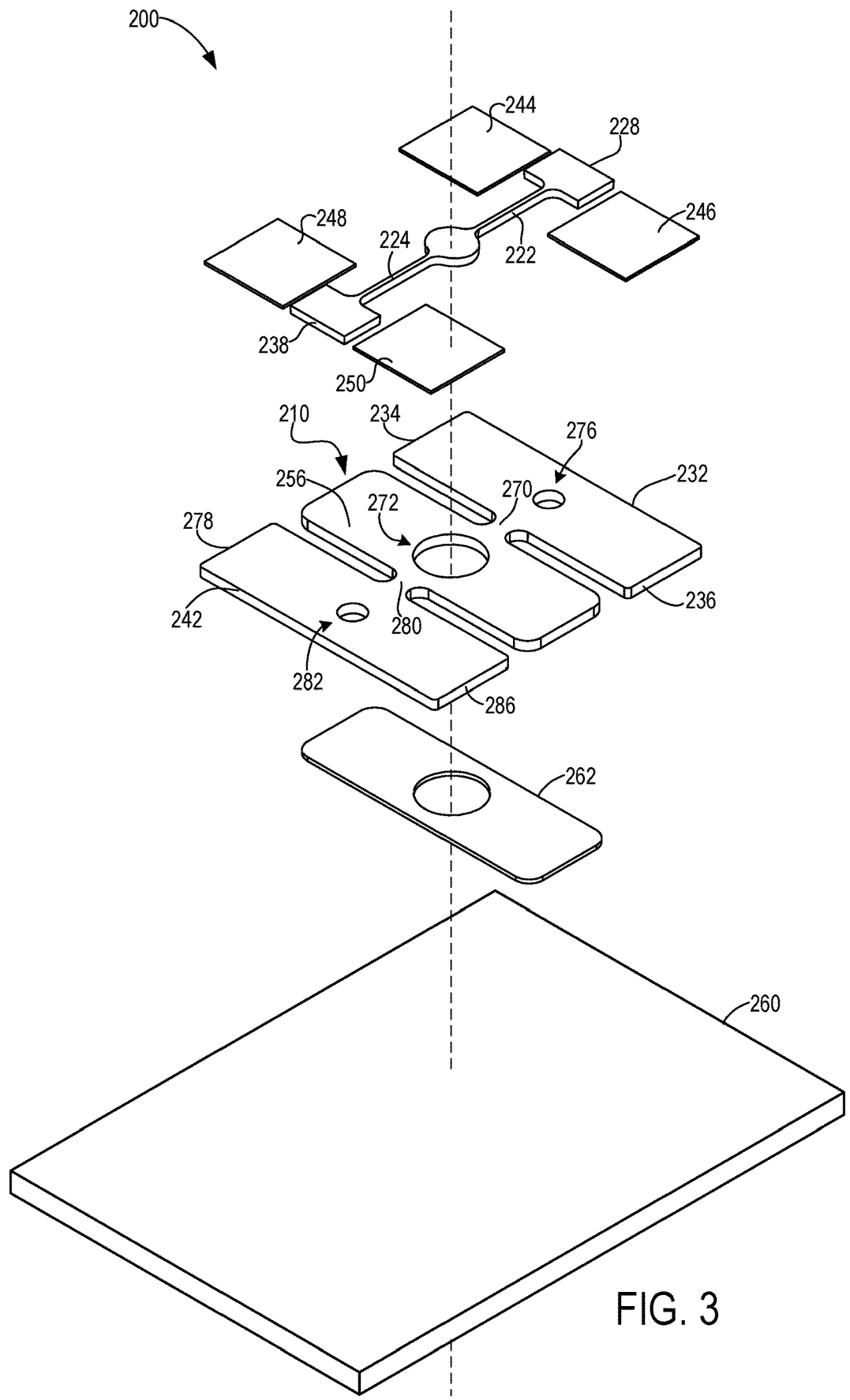
FIG. 3 shows an exploded view of the scanning mirror system of FIG. 2.
Figure 4:
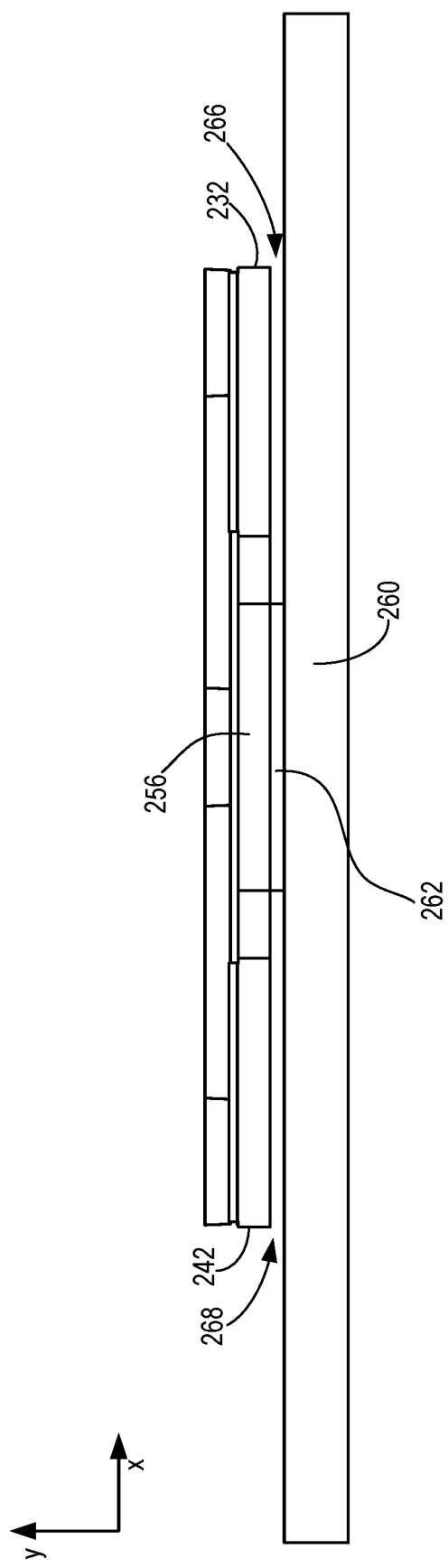
FIG. 4 shows a side view of the scanning mirror system of FIG. 2.

FIGS. 2-4 show an example scanning mirror system 200 that includes a scanning mirror assembly 206 comprising a first example of an actuator frame 210. Scanning mirror assembly 206 comprises a MEMS mirror 218 attached to the actuator frame 210 via a first flexure 222 and a second flexure 224. First and second flexures 222 and 224 may provide respective pivots via which mirror 218 can rotate and thereby change its angular orientation to vary the angle at which light from a light source is reflected. Mirror 218 may scan in a horizontal or vertical direction, depending upon an orientation in which scanning mirror system 200 is incorporated into a display device.

The first flexure 222 of scanning mirror assembly 206 is connected to a first anchor portion 228. This first anchor portion is affixed to a first moveable member 232 of the actuator frame 210. In a similar manner, the second flexure 224 of scanning mirror assembly 206 is connected to a second anchor portion 238 that is affixed to a second moveable member 242 of the actuator frame 210. As described in more detail below, actuators affixed to the moveable members are controlled to cause corresponding movement in the mirror 218.

In this example, the scanning mirror system 200 includes an electromechanical actuator system comprising a first actuator pair affixed to the first moveable member 232 adjacent to the first flexure 222, and a second actuator pair affixed to the second moveable member 242 adjacent to the second flexure 224. The first actuator pair comprises first actuator 244 and second actuator 246, and the second actuator pair comprises third actuator 248 and fourth actuator 250.

The actuators may be controlled to cause a desired oscillation in the mirror 218. For example, the actuators may comprise a PZT material that changes dimension based upon an applied voltage. For example, upon receiving an electrical signal having a first polarity (e.g., positive), actuators 244 and 248 may apply a contractive force to portions of moveable members 232 and 242, respectively, underlying these actuators. An electrical signal having a second, different polarity (e.g., negative) may cause actuators 246 and 250 to apply a dilative force to opposing portions of moveable members 232 and 242, respectively, underlying these actuators. The magnitude of force applied by actuators 244, 246, 248 and 250 may be controlled by controlling the magnitude of an electrical signal applied to the actuators.

In other examples the electromechanical actuator system of scanning mirror system 200 may utilize any suitable type of actuators. For example, each actuator may comprise a magnetic actuator, wherein a magnetic force between magnetic elements can be varied via electrical signal. In other examples, each actuator may comprise an electrostatic actuator, where an electric field between electrodes can be varied to adjust contractive or dilative forces. As a further example, each electromechanical actuator may utilize one or more bimetallic strips, where differing coefficients of thermal expansion of different materials can be leveraged to vary the applied forces. It will also be appreciated that actuator(s) of an electromechanical actuator system may be arranged at other suitable locations in a scanning mirror system.

In this example, a central mounting member 256 of the actuator frame 210 is affixed to an underlying substrate 260 via a spacer 262. In some examples the actuator frame 210 may comprise a metallic material, such as steel, and the substrate 260 may comprise a PCB, ceramic material, or any other suitable material. The spacer 262 may comprise any suitable metallic material, such as steel, ceramic material, or any other suitable material. The central mounting member 256 may be bonded to the spacer 262, and the spacer bonded to the substrate 260 using any suitable methods.

In the example of FIGS. 2-7, spacer 262 elevates the actuator frame 210 above the substrate 260 to thereby enable movement of the moveable members 232 and 242. More particularly and as shown in FIG. 4, spacer 262 creates gaps 266 and 268 between moveable members 232 and 242, respectively, and the underlying substrate 260. In this manner, the first moveable member 232 and the second moveable member 242 float above the substrate 260, and thereby may cause movement of the mirror 218 via flexures 222 and 224. In one example, each of the gaps 266 and 268 may be approximately 0.5 mm. to enable y-axis movement of the first moveable member 232 and second moveable member 242 relative to the substrate 260. In other examples, any other suitable gap distances may be utilized to accommodate different scanning mirror system configurations and desired mirror movements. In the present example, the spacer 262 has substantially the same shape as the mounting member 256 of the actuator frame 210. In other examples, the spacer 262 may have a shape different from the mounting member 256.

As noted above, existing scanning mirror configurations directly couple opposing actuators having the same polarization located on opposing ends of the frame. During operation such structural coupling can cause spurious modes and corresponding exaggerated movement and other undesirable vibrations in the mirror. These spurious modes both increase component stresses and reduce reliability of the scanning mirror assembly, while also decreasing the power efficiency of the system.

In the present example, to substantially minimize spurious modes and provide increased power efficiency, the configuration of actuator frame 210 utilizes centrally-located hinges to connect the mounting member with the moveable members. As described in more detail below, this configuration substantially suppresses undesired spurious modes while correspondingly increasing system efficiency. Further, such hinges may be utilized with mounting members having a variety of shapes and sizes, thereby enabling multiple different structural configurations and layouts of mounting members. For example, a footprint of a mounting member utilizing the disclosed hinges may be larger or smaller according to particular applications or implementation requirements.

Figure 5:
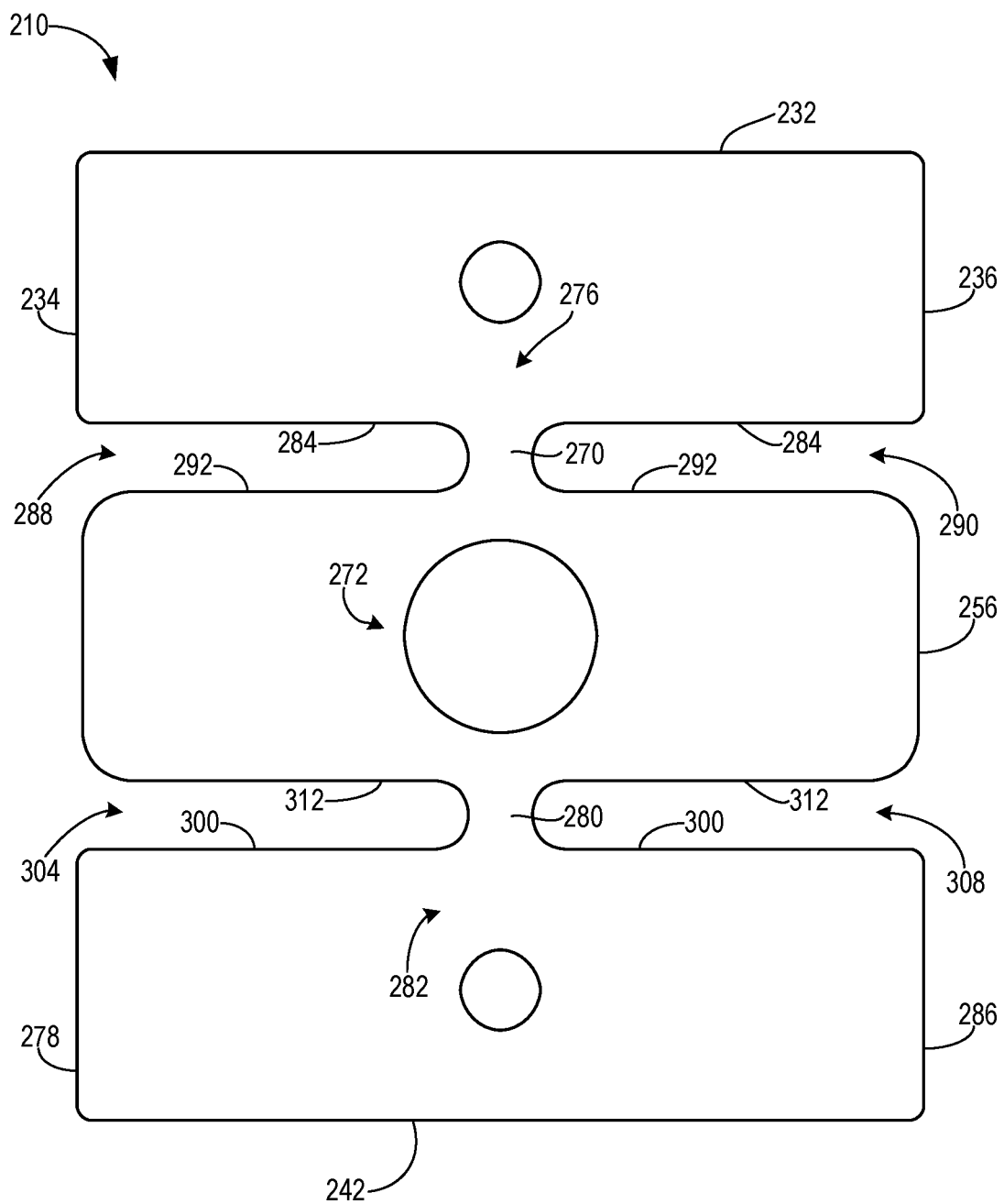
FIG. 5 shows a top view of the actuator frame of the scanning mirror system of FIG. 2.
Figure 6:
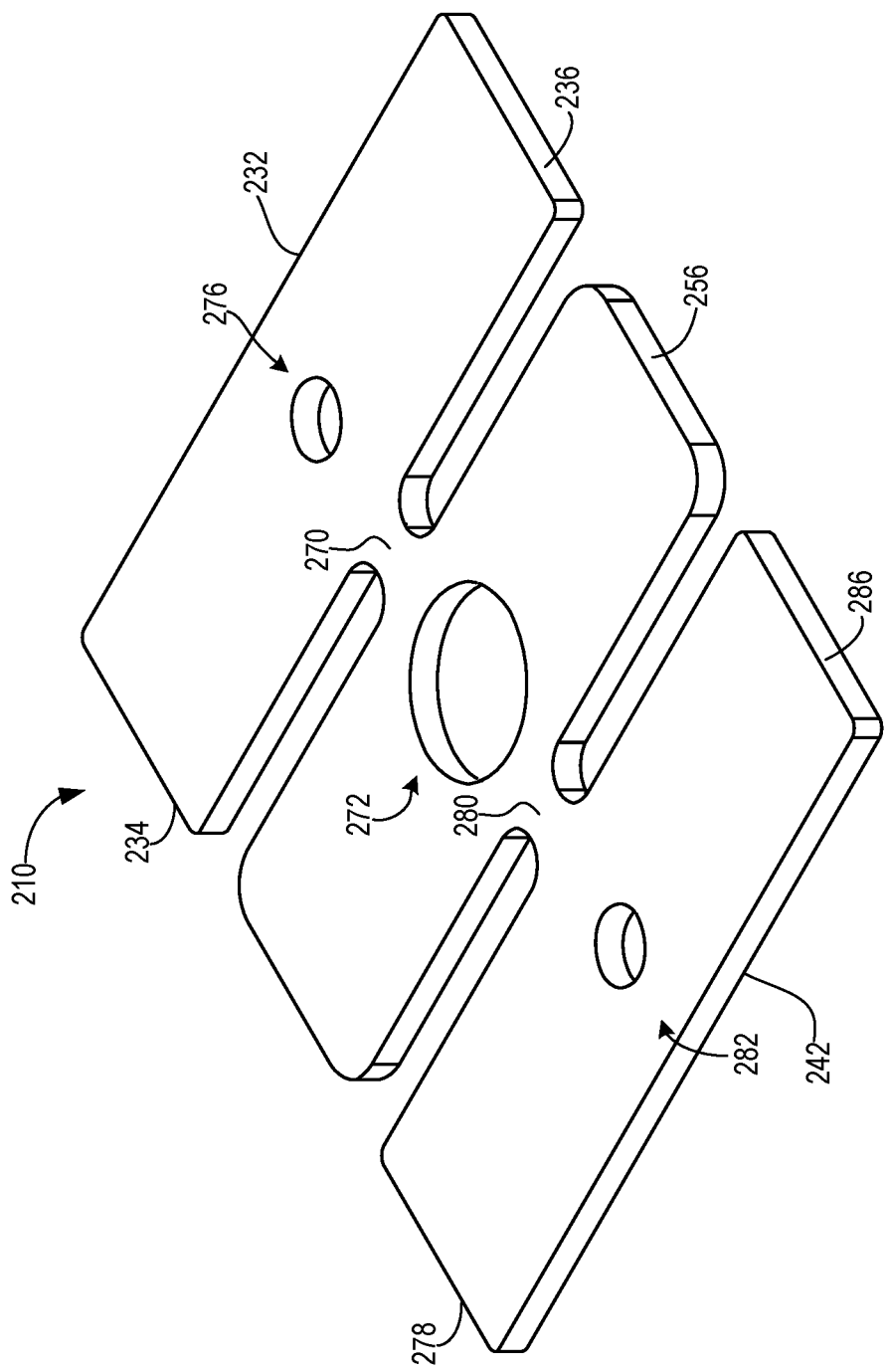
FIG. 6 shows a perspective view of the actuator frame of FIG. 5.

As best seen in FIGS. 3, 5 and 6, the actuator frame 210 comprises a first hinge 270 that connects a central portion 272 of the mounting member 256 with a central portion 276 of the first moveable member 232. In this example, the first hinge 270 is located substantially equidistant from the opposing ends 234 and 236 of the first moveable member 232. Similarly, the central portion 276 of the first moveable member 232 is located substantially midway between the opposing ends 234 and 236 of the first moveable member. In this example, both central portion 272 and central portion 276 comprise an aperture. It will be appreciated that in other examples, the mounting member 256 and first moveable member 232 may have different configurations that include one or more apertures of different shapes, sizes, and/or locations, or configurations that include no apertures.

In a similar manner, actuator frame 210 comprises a second hinge 280 that connects central portion 272 of the mounting member 256 with a central portion 282 of the second moveable member 242. As with the first hinge 270, the second hinge 280 is located substantially equidistant from the opposing ends 278 and 286 of the second moveable member 242. The central portion 282 of the second moveable member 242 is also located substantially midway between the opposing ends 278 and 286 of the second moveable member. In this example, both central portion 272 and central portion 282 comprise an aperture. As with the first moveable member 232, in other examples the mounting member 256 and second moveable member 242 may have different configurations that include apertures of different shapes, sizes, and/or locations, or configurations that include no apertures. In some examples, actuator frame 210 may be formed from micromachined silicon dies.

Figure 7:
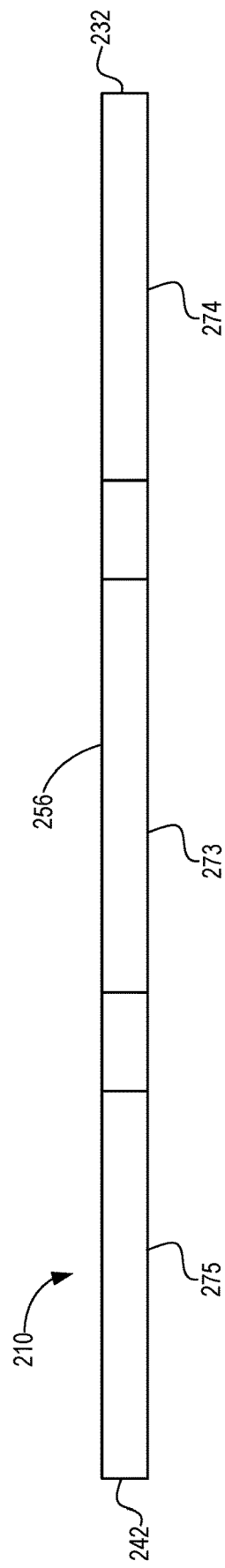
FIG. 7 shows a side view of the actuator frame of FIG. 5.
Figure 8:
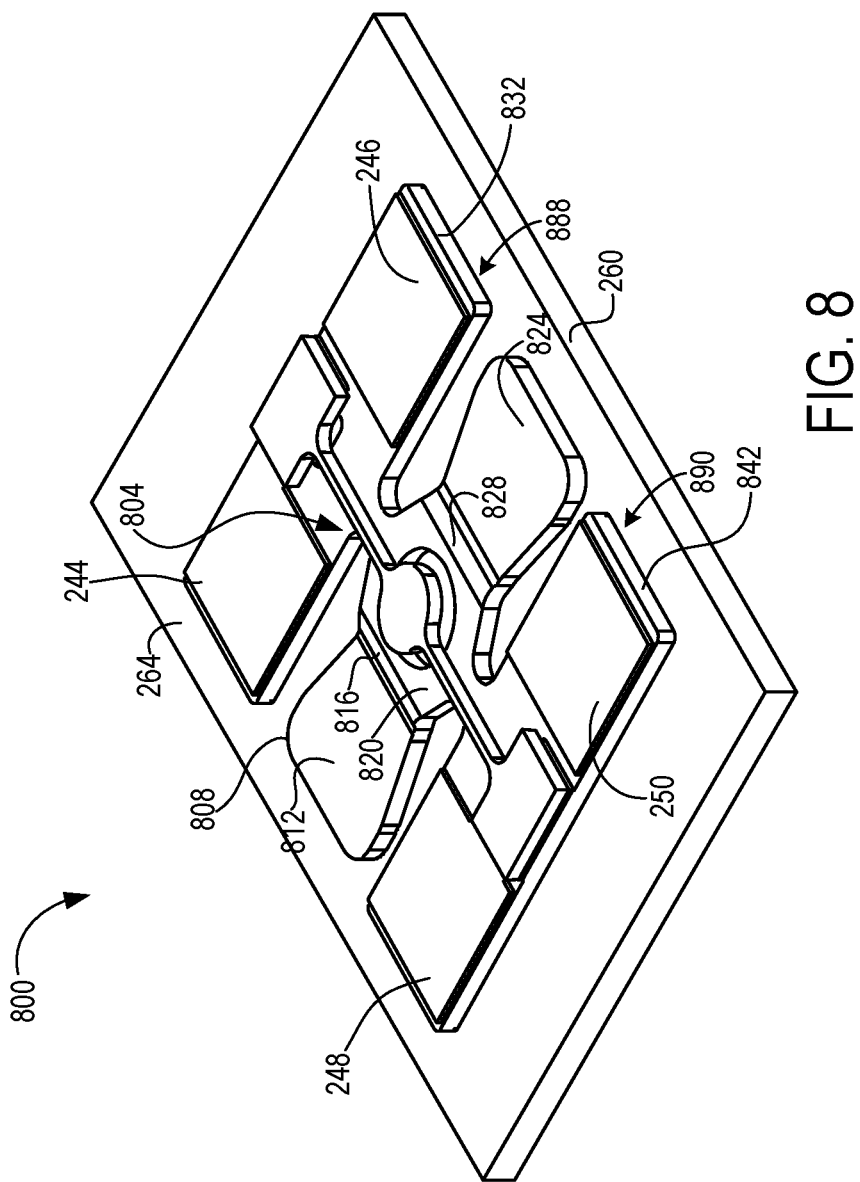
FIG. 8 shows another example scanning mirror system including an actuator frame according to other examples of the present disclosure.

With reference now to FIG. 7, the mounting member 256 comprises a mounting planar bottom surface 273, the first moveable member 232 comprises a first planar bottom surface 274, and the second moveable member 242 comprises a second planar bottom surface 275. In this example, the mounting planar bottom surface 273, first planar bottom surface 274 and second planar bottom surface 275 are coplanar. In other examples and as described in more detail below, at least portions of the mounting planar bottom surface 273, first planar bottom surface 274 and second planar bottom surface 275 may not be coplanar.

With reference now to FIG. 5, the first moveable member 232 comprises a first interior side 284 that defines a first gap 288 and a second gap 290 with the first side 292 of the mounting member 256. In a similar manner, the second moveable member 242 comprises a second interior side 300 that defines a third gap 304 and a fourth gap 308 with the second side 312 of the mounting member 256. In this configuration, the first hinge 270 separates the first gap 288 from the second gap 290, and the second hinge 280 separates the third gap 304 from the fourth gap 308.

With reference again to FIG. 3 and in one potential advantage of this configuration, the structural coupling of moveable members 232 and 242 to the mounting member 256 is constrained to these centrally-located first and second hinges 270 and 280. In this manner, vibrations and other movements of the moveable members 232 and 242 are transmitted solely through these centrally-located hinges to the mounting member 256 that is rigidly affixed to the underlying substrate 260. Accordingly, the mounting member 256 may substantially attenuate such vibrations and movements received from one moveable member, whereby the other moveable member receives only highly attenuated vibrations/movements from the opposite moveable member. In this manner, the spurious modes and corresponding exaggerated movements and component stresses created by prior actuator frames may be substantially eliminated.

For example, where first PZT actuator 244 and third PZT actuator 248 have the same polarization, by structurally decoupling these two actuators in this manner, the present configuration effectively suppresses undesired spurious modes that may be created by other actuator frame designs. Further, utilizing first and second hinges in this manner allows for the structural design of the actuator frame 210 to include a mounting member 256 having a substantial footprint that is affixed to the underlying substrate 260. In this manner, such a substantial footprint makes the actuator frame 210 even more resistant to ambient perturbations such as boundary conditions.

With reference now to FIGS. 8-12, another example of a scanning mirror system and actuator frame is disclosed. In this example and as described in more detail below, a portion of the actuator frame 804 of the scanning mirror system 800 is affixed directly to the underlying substrate 260, with no spacer in between. To elevate the moveable members above the substrate, the mounting member of the actuator frame includes upwardly extending elbows that create gaps between the moveable members and the substrate. In this example, the actuator frame 804 comprises a central mounting member 808 that includes a first planar mounting portion 812 and a first elbow 816 between the first planar mounting portion and an elevated central portion 820 of the mounting member. In a similar manner, and on the other side of the elevated central portion 820, the actuator frame 804 comprises a second planar mounting portion 824 and a second elbow 828 between the second planar mounting portion and the elevated central portion.

Figure 9:
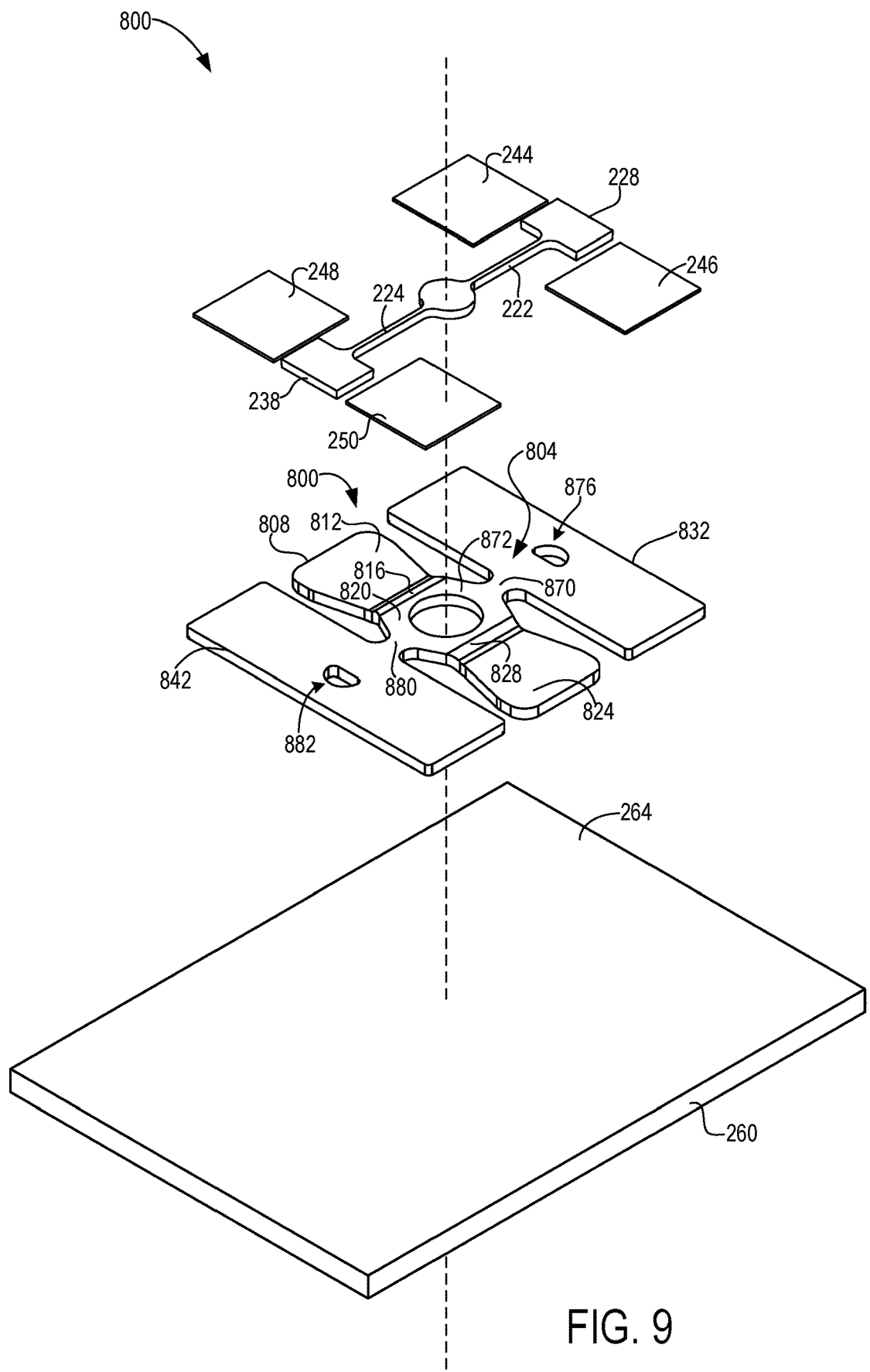
FIG. 9 shows an exploded view of the scanning mirror system of FIG. 8.
Figure 10:
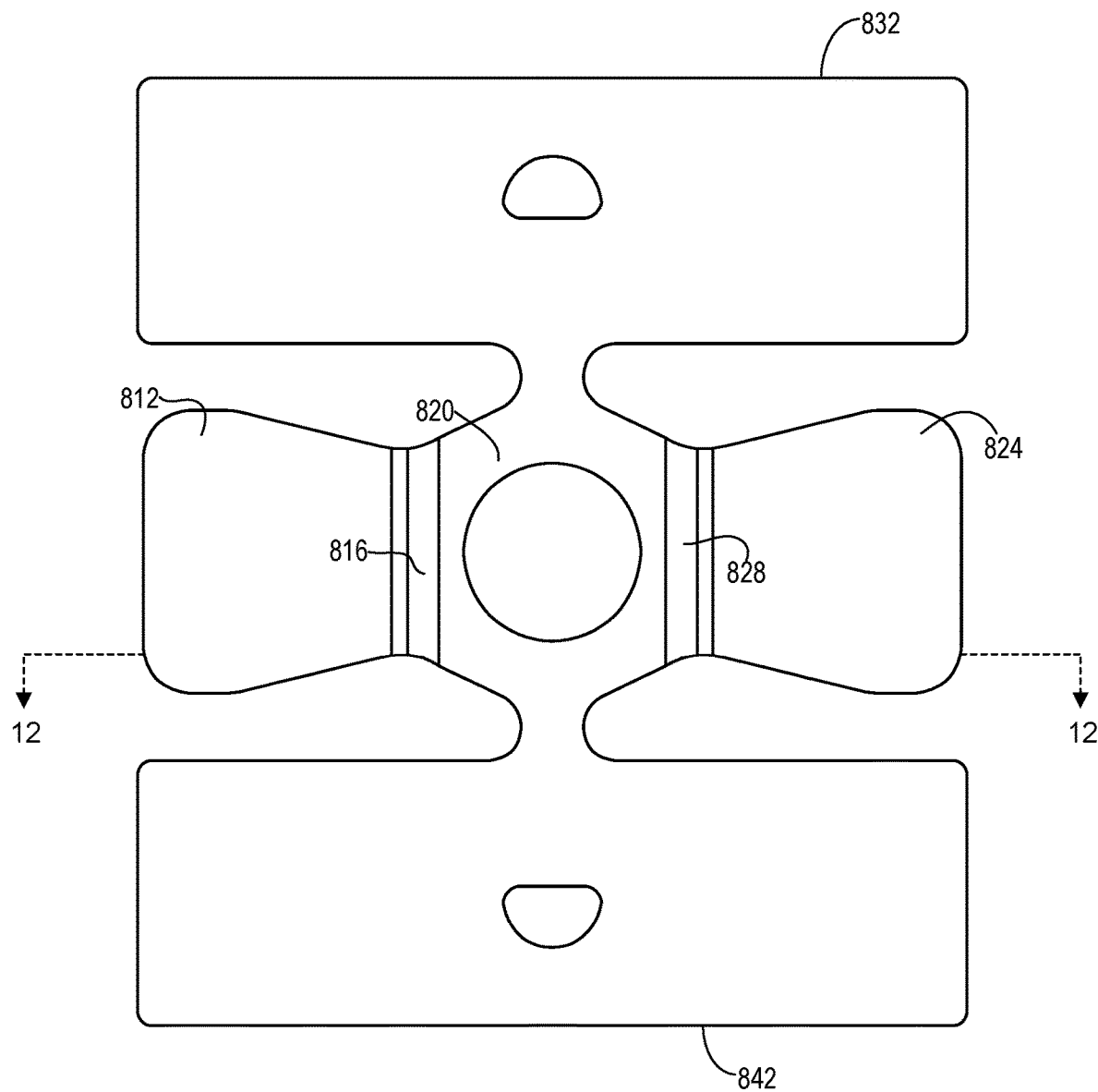
FIG. 10 shows a top view of the actuator frame of the scanning mirror system of FIG. 8.
Figure 11:
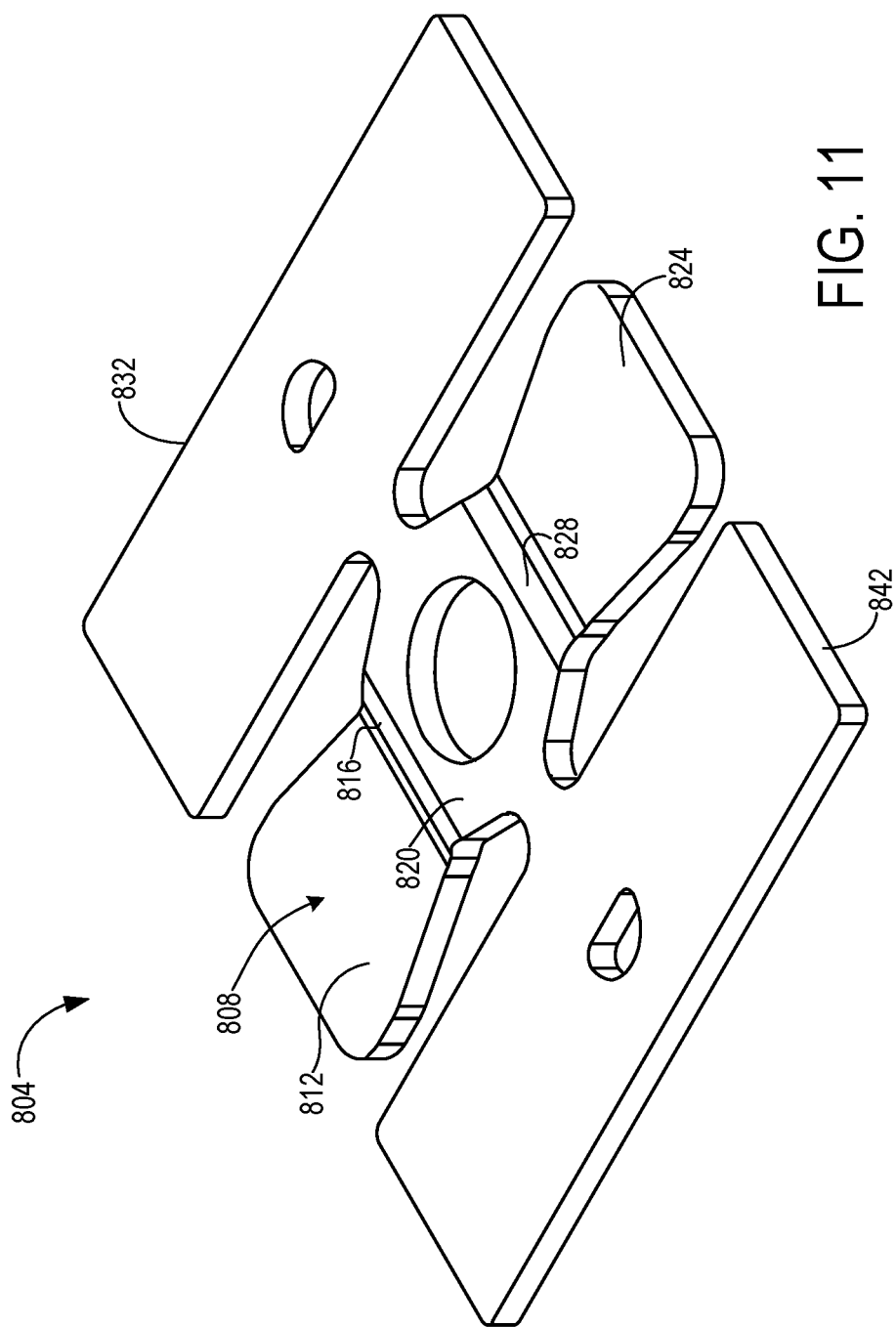
FIG. 11 shows a perspective view of the actuator frame of FIG. 10.

As with the scanning mirror system 200 described above, in this example the scanning mirror system 800 comprises a first actuator pair 244, 246 affixed to a first moveable member 832 adjacent to the first flexure 222, and a second actuator pair 248, 250 affixed to the second moveable member 842 adjacent to the second flexure 224. With reference to FIG. 9, actuator frame 804 comprises a first hinge 870 that connects a central portion 872 of the mounting member 808 with a central portion 876 of the first moveable member 832. In this example, both central portion 872 and central portion 876 comprise an aperture. It will be appreciated that in other examples, the mounting member 808 and first moveable member 832 may have different configurations that include apertures of different shapes, sizes, and/or locations, or configurations including no apertures.

In a similar manner, actuator frame 804 comprises a second hinge 880 that connects central portion 872 of the mounting member 808 with a central portion 882 of the second moveable member 842. In this example, both central portion 872 and central portion 882 comprise an aperture. It will be appreciated that in other examples, the mounting member 808 and second moveable member 842 may have different configurations that include apertures of different shapes, sizes, and/or locations, or configurations including no apertures. In some examples, actuator frame 804 may be formed from micromachined silicon dies.

Figure 12:
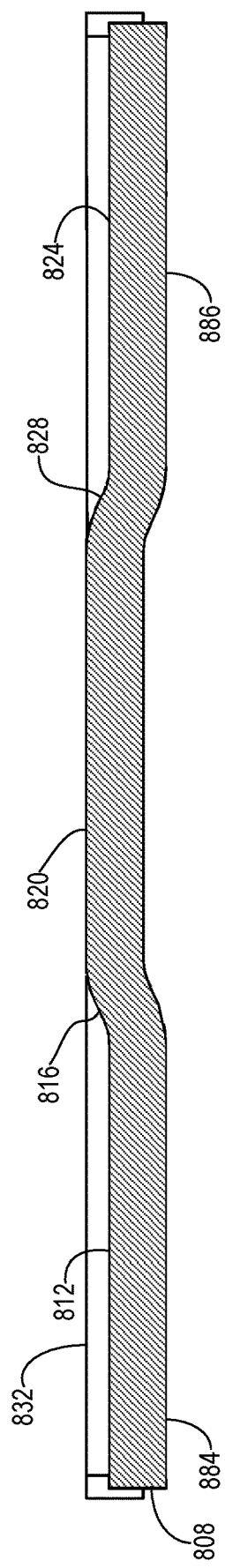
FIG. 12 shows a cutaway side view of the actuator frame taken along line 12-12 of FIG. 10.

In this example and as noted above, the first planar mounting portion 812 and second planar mounting portion 824 are affixed to the underlying substrate 260. With reference to FIGS. 9 and 12, a bottom surface 884 of the first planar mounting portion 812 of mounting member 808 is affixed to the top surface 264 of the substrate 260. Similarly, a bottom surface 886 of the second planar mounting portion 824 is affixed to the top surface 264 of the substrate 260.

The first elbow 816 and second elbow 828 of mounting member 808 raise the elevated central portion 820 of the mounting member above the top surface 264 of the substrate 260. In this manner, the first hinge 870, first moveable member 832, second hinge 880 and second moveable member 842 are also elevated above the substrate 260. Accordingly, this configuration also creates gaps 888 and 890 between the first moveable member 832 and the top surface 264 of substrate 260 and between the second moveable member 842 and the top surface, respectively. In one example, gaps 888 and 890 may be approximately 0.5 mm. to enable y-axis movement of the first moveable member 832 and second moveable member 842 relative to the substrate 260. In other examples, any other suitable gap distances may be utilized. It will be appreciated that the other components of the scanning mirror system 800 may be substantially the same as those components of the scanning mirror system 200 described above, and corresponding reference numbers are shown accordingly.

Figure 13:
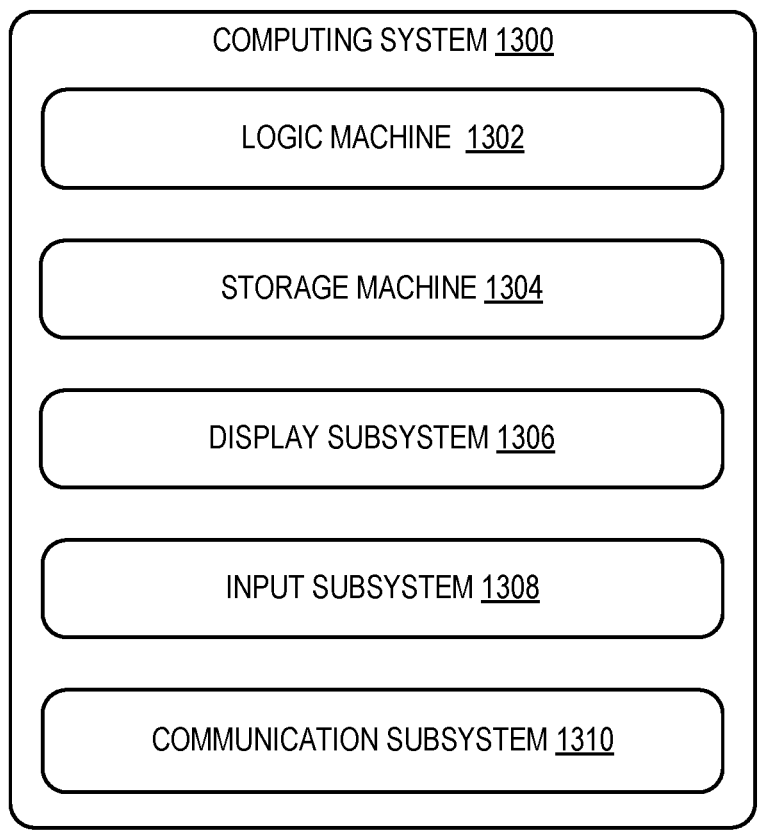
FIG. 13 shows a block diagram of an example computing system according to examples of the present disclosure.

FIG. 13 schematically shows a non-limiting embodiment of a computing system 1300 that may be utilized with and/or incorporated into the display devices and scanning mirror systems described above. Computing system 1300 is shown in simplified form. Computing system 1300 may take the form of one or more virtual reality HMD devices, mixed reality HMD devices, head-up display devices, mobile device screens, monitors, televisions, personal computers, tablet computers, home-entertainment computers, gaming devices, mobile computing devices, mobile communication devices (e.g., smart phone), and/or other computing devices.

Computing system 1300 includes a logic machine 1302 and a storage machine 1304. Computing system 1300 may optionally include a display subsystem 1306, input subsystem 1308, communication subsystem 1310, and/or other components not shown in FIG. 13.

Logic machine 1302 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors or controllers configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 1304 includes one or more physical devices configured to hold instructions executable by the logic machine to implement the methods and processes described herein. When such methods and processes are implemented, the state of storage machine 1304 may be transformed—e.g., to hold different data.

Storage machine 1304 may include removable and/or built-in devices. Storage machine 1304 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 1304 may include volatile, nonvolatile, dynamic, static, read/write, read-only, random-access, sequential-access, location-addressable, file-addressable, and/or content-addressable devices.

It will be appreciated that storage machine 1304 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 1302 and storage machine 1304 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 1300 implemented to perform a particular function. In some cases, a module, program, or engine may be instantiated via logic machine 1302 executing instructions held by storage machine 1304. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 1306 may be used to present a visual representation of data held by storage machine 1304. As the herein described methods and processes change the data held by the storage machine, and thus transform the state of the storage machine, the state of display subsystem 1306 may likewise be transformed to visually represent changes in the underlying data. Display subsystem 1306 may include one or more display devices utilizing virtually any type of technology. Such display devices may be combined with logic machine 1302 and/or storage machine 1304 in a shared enclosure, or such display devices may be peripheral display devices.

When included, input subsystem 1308 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 1310 may be configured to communicatively couple with one or more other computing devices. Communication subsystem 1310 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow Computing system 1300 to send and/or receive messages to and/or from other devices via a network such as the Internet.

It is to be understood that the configurations and/or approaches described herein are exemplary in nature, and that these specific embodiments or examples are not to be considered in a limiting sense as numerous variations are possible. The subject matter of the present disclosure includes all novel and nonobvious combinations and sub-combinations of the various processes, systems and configurations, and other features, functions, acts, and/or properties disclosed herein, as well as any and all equivalents thereof.

The following paragraphs provide additional support for the claims of the subject application. One aspect provides an actuator frame for a scanning mirror assembly, comprising: a mounting member comprising a first side and an opposite second side; a first moveable member comprising a first interior side that defines a first gap and a second gap with the first side of the mounting member; a second moveable member comprising a second interior side that defines a third gap and a fourth gap with the second side of the mounting member; a first hinge connecting a central portion of the mounting member with the first moveable member, and a second hinge connecting the central portion of the mounting member with the second moveable member. The scanning mirror assembly may additionally or alternatively include, wherein the first hinge separates the first gap from the second gap, and the second hinge separates the third gap from the fourth gap. The scanning mirror assembly may additionally or alternatively include, wherein the mounting member comprises a mounting planar bottom surface, the first moveable member comprises a first planar bottom surface, and the second moveable member comprises a second planar bottom surface, and the mounting planar bottom surface, the first planar bottom surface and the second planar bottom surface are coplanar. The scanning mirror assembly may additionally or alternatively include, wherein the mounting member comprises: a first planar mounting portion; a first elbow between the first planar mounting portion and the central portion; a second planar mounting portion; and a second elbow between the second planar mounting portion and the central portion. The scanning mirror assembly may additionally or alternatively include, wherein the mounting member is affixed to a substrate, and the first moveable member and the second moveable member float above the substrate. The scanning mirror assembly may additionally or alternatively include, wherein the mounting member is affixed to the substrate via a spacer. The scanning mirror assembly may additionally or alternatively include, wherein the mounting member is affixed directly to the substrate.

Another aspect provides a scanning mirror system, comprising: an actuator frame, comprising: a mounting member comprising a first side and an opposite second side; a first moveable member comprising a first interior side that defines a first gap and a second gap with the first side of the mounting member; a second moveable member comprising a second interior side that defines a third gap and a fourth gap with the second side of the mounting member; a first hinge connecting a central portion of the mounting member with the first moveable member, and a second hinge connecting the central portion of the mounting member with the second moveable member; a plurality of actuators affixed to the first moveable member and the second moveable member; and a scanning mirror assembly affixed to the first moveable member and the second moveable member. The scanning mirror assembly may additionally or alternatively include a substrate, wherein the mounting member is affixed to the substrate, and the first moveable member and the second moveable member float above the substrate. The scanning mirror assembly may additionally or alternatively include a spacer between the mounting member and the substrate, wherein the mounting member is affixed to the substrate via the spacer. The scanning mirror assembly may additionally or alternatively include, wherein the mounting member is affixed directly to the substrate. The scanning mirror assembly may additionally or alternatively include, wherein the scanning mirror assembly comprises: a first anchor portion affixed to the first moveable member; and a second anchor portion affixed to the second moveable member. The scanning mirror assembly may additionally or alternatively include, wherein the first hinge separates the first gap from the second gap, and the second hinge separates the third gap from the fourth gap. The scanning mirror assembly may additionally or alternatively include, wherein the mounting member comprises a mounting planar bottom surface, the first moveable member comprises a first planar bottom surface, the second moveable member comprises a second planar bottom surface, and the mounting planar bottom surface, the first planar bottom surface and the second planar bottom surface are coplanar. The scanning mirror assembly may additionally or alternatively include, wherein the mounting member comprises: a first planar mounting portion; a first elbow between the first planar mounting portion and the central portion; a second planar mounting portion; and a second elbow between the second planar mounting portion and the central portion.

Another aspect provides an actuator frame for a scanning mirror assembly, comprising: a mounting member comprising: a first side; a second side opposite to the first side; and a mounting planar bottom surface; a first moveable member comprising a first planar bottom surface and a first interior side that defines a first gap and a second gap with the first side of the mounting member; a second moveable member comprising a second planar bottom surface and a second interior side that defines a third gap and a fourth gap with the second side of the mounting member; a first hinge connecting a central portion of the mounting member with the first moveable member, and a second hinge connecting the central portion of the mounting member with the second moveable member. The scanning mirror assembly may additionally or alternatively include, wherein the first hinge separates the first gap from the second gap, and the second hinge separates the third gap from the fourth gap. The scanning mirror assembly may additionally or alternatively include, wherein the mounting planar bottom surface, the first planar bottom surface and the second planar bottom surface are coplanar. The scanning mirror assembly may additionally or alternatively include, a spacer affixed to the mounting planar bottom surface, wherein the spacer is affixed to a substrate. The scanning mirror assembly may additionally or alternatively include, wherein the first moveable member and the second moveable member float above the substrate.

The invention claimed is:

1. An actuator frame for a scanning mirror assembly, comprising:
   a mounting member comprising a first side and an opposite second side, the mounting member comprising a bottom surface affixed to an underlying substrate either directly or via a spacer;
   a first moveable member comprising a first interior side that defines a first gap and a second gap with the first side of the mounting member;
   a second moveable member comprising a second interior side that defines a third gap and a fourth gap with the second side of the mounting member;
   a first hinge connecting a central portion of the mounting member with the first moveable member; and
   a second hinge connecting the central portion of the mounting member with the second moveable member;
   wherein the first moveable member and the second moveable member float relative to the substrate and are configured to move relative to the mounting member and the substrate.

2. The actuator frame of claim 1, wherein the first hinge separates the first gap from the second gap, and the second hinge separates the third gap from the fourth gap.

3. The actuator frame of claim 1, wherein the bottom surface is a mounting planar bottom surface, the first moveable member comprises a first planar bottom surface, and the second moveable member comprises a second planar bottom surface, and the mounting planar bottom surface, the first planar bottom surface and the second planar bottom surface are coplanar.

4. The actuator frame of claim 1, wherein the mounting member comprises:
   a first planar mounting portion;
   a first elbow between the first planar mounting portion and the central portion;
   a second planar mounting portion; and
   a second elbow between the second planar mounting portion and the central portion.

5. The actuator frame of claim 1, wherein the first moveable member and the second moveable member float above the substrate.

6. The actuator frame of claim 1, wherein the first moveable member and the second moveable member are configured to move in a y-axis direction relative to the mounting member and the substrate.

7. The actuator frame of claim 1, wherein the first moveable member and the second moveable member are configured to be coupled to a mirror via a first flexure and a second flexure, and thereby cause movement of the mirror.

8. A scanning mirror system, comprising:
   an actuator frame, comprising:
      a mounting member comprising a first side and an opposite second side, the mounting member comprising a bottom surface affixed to an underlying substrate either directly or via a spacer;
      a first moveable member comprising a first interior side that defines a first gap and a second gap with the first side of the mounting member;
      a second moveable member comprising a second interior side that defines a third gap and a fourth gap with the second side of the mounting member;
      a first hinge connecting a central portion of the mounting member with the first moveable member; and
      a second hinge connecting the central portion of the mounting member with the second moveable member;
      wherein the first moveable member and the second moveable member float relative to the substrate and are configured to move relative to the mounting member and the substrate;
   a plurality of actuators affixed to the first moveable member and the second moveable member; and
   a scanning mirror assembly affixed to the first moveable member and the second moveable member.

9. The scanning mirror system of claim 8, wherein the first moveable member and the second moveable member float above the substrate.

10. The scanning mirror system of claim 9, wherein the spacer is positioned between the mounting member and the substrate.

11. The scanning mirror system of claim 8, wherein the scanning mirror assembly comprises:
    a first anchor portion affixed to the first moveable member; and
    a second anchor portion affixed to the second moveable member.

12. The scanning mirror system of claim 8, wherein the first hinge separates the first gap from the second gap, and the second hinge separates the third gap from the fourth gap.

13. The scanning mirror system of claim 8, wherein the bottom surface is a mounting planar bottom surface, the first moveable member comprises a first planar bottom surface, the second moveable member comprises a second planar bottom surface, and the mounting planar bottom surface, the first planar bottom surface and the second planar bottom surface are coplanar.

14. The scanning mirror system of claim 8, wherein the mounting member comprises:
    a first planar mounting portion;
    a first elbow between the first planar mounting portion and the central portion;
    a second planar mounting portion; and
    a second elbow between the second planar mounting portion and the central portion.

15. An actuator frame for a scanning mirror assembly, comprising:
    a mounting member comprising:
       a first side;
       a second side opposite to the first side; and
       a mounting planar bottom surface affixed to an underlying substrate either directly or via a spacer;
    a first moveable member comprising a first planar bottom surface and a first interior side that defines a first gap and a second gap with the first side of the mounting member;
    a second moveable member comprising a second planar bottom surface and a second interior side that defines a third gap and a fourth gap with the second side of the mounting member;
    a first hinge connecting a central portion of the mounting member with the first moveable member; and
    a second hinge connecting the central portion of the mounting member with the second moveable member;
    wherein the first moveable member and the second moveable member float relative to the substrate and are configured to move relative to the mounting member and the substrate.

16. The actuator frame of claim 15, wherein the first hinge separates the first gap from the second gap, and the second hinge separates the third gap from the fourth gap.

17. The actuator frame of claim 15, wherein the mounting planar bottom surface, the first planar bottom surface and the second planar bottom surface are coplanar.

18. The actuator frame of claim 15, wherein the spacer is affixed to the mounting planar bottom surface, and wherein the spacer is affixed to the substrate.

19. The actuator frame of claim 18, wherein the first moveable member and the second moveable member float above the substrate.

\* \* \* \* \*